Aug. 17, 1937.  H. J. WAECHTER  2,090,585
AUTOGRAPHIC REGISTER
Filed Jan. 24, 1936   5 Sheets-Sheet 1
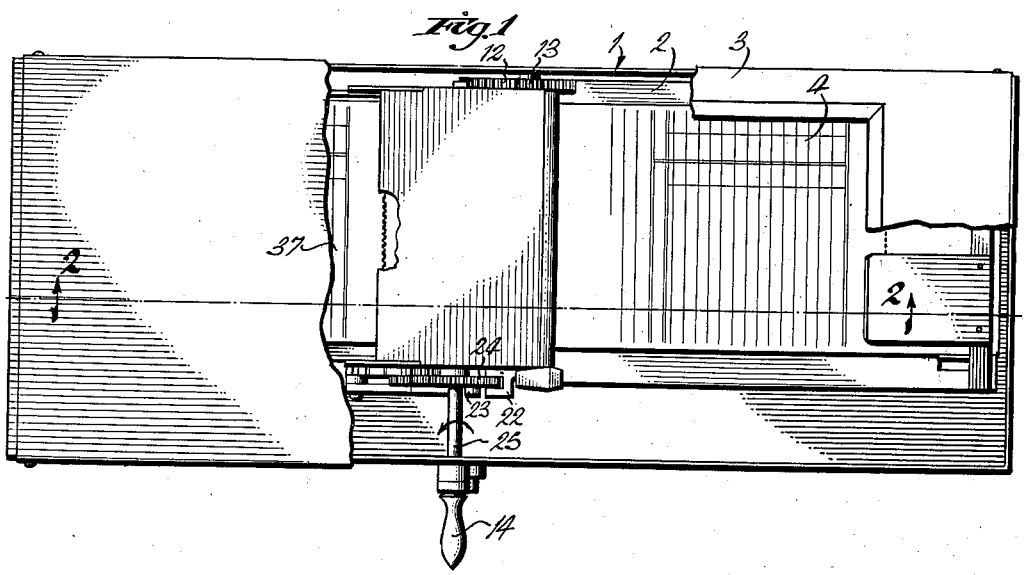
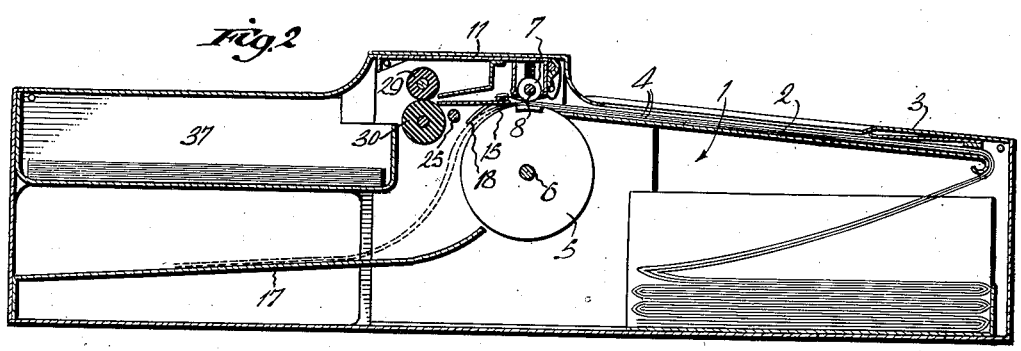
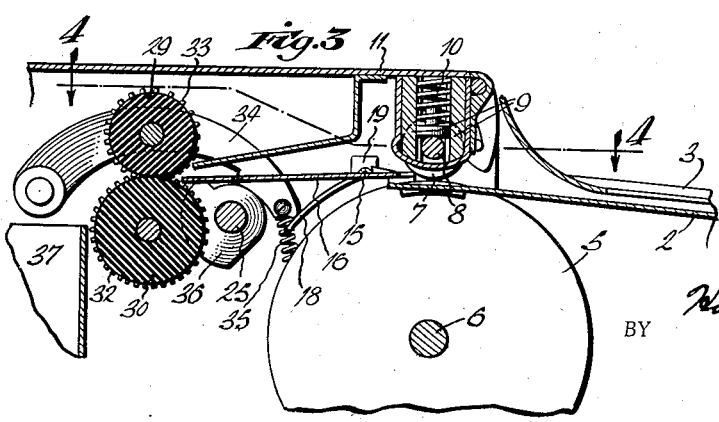
INVENTOR.
Harry J. Waechter
BY Wood + Wood
ATTORNEYS.

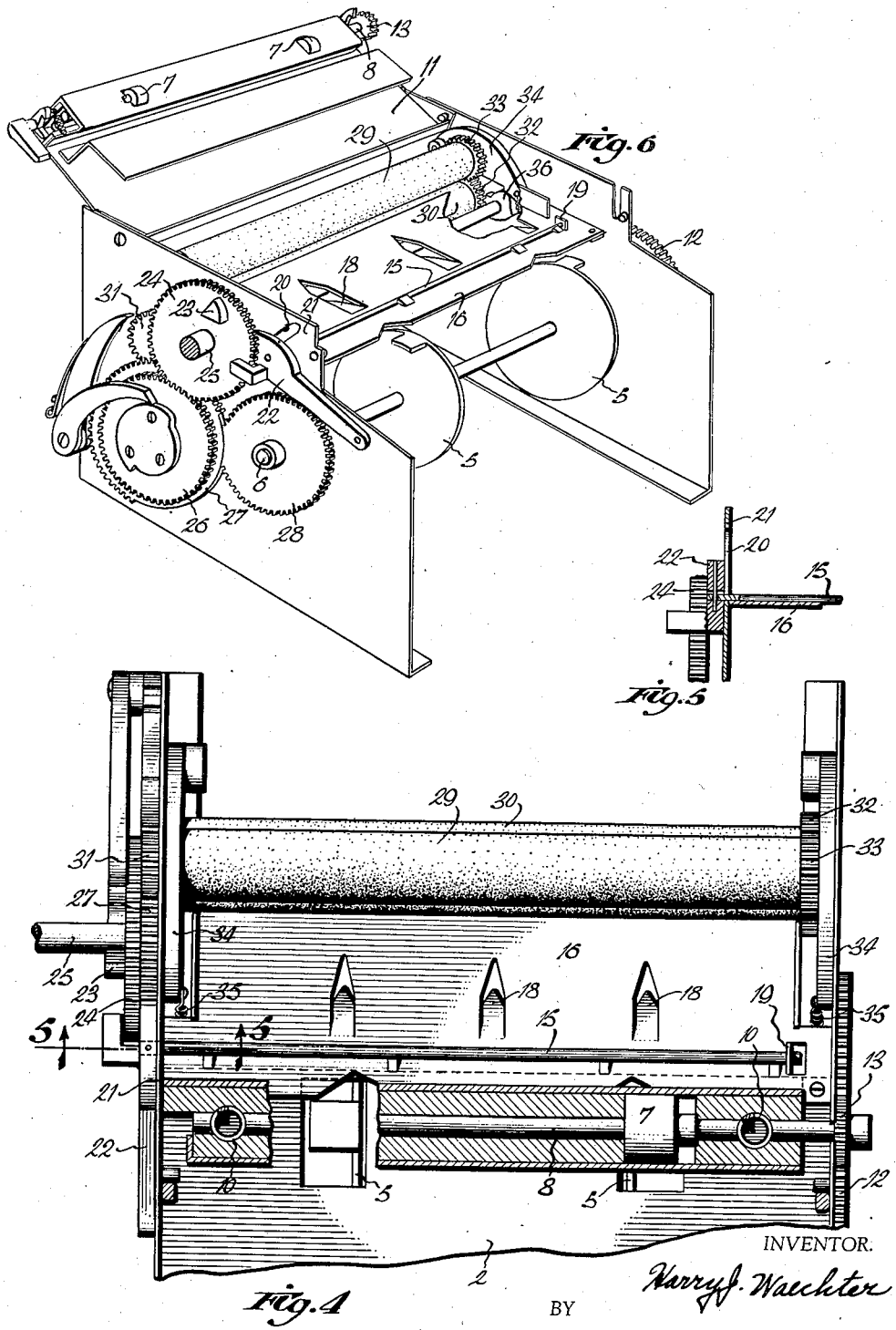

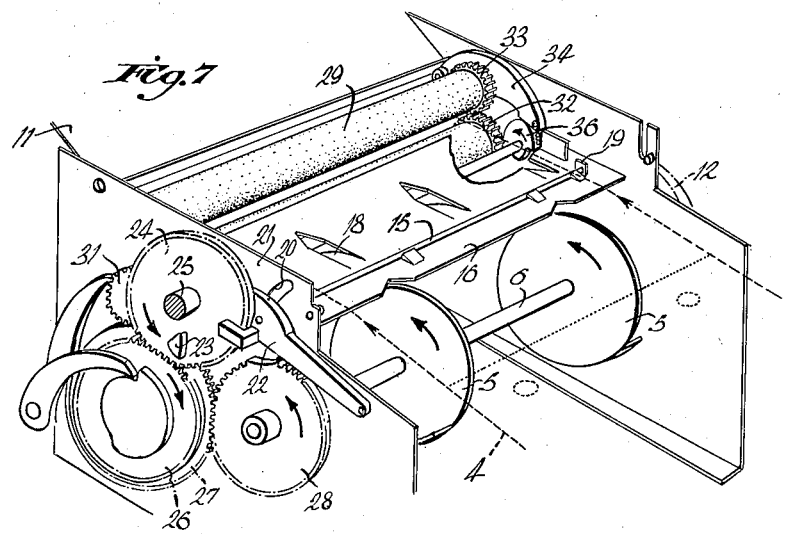
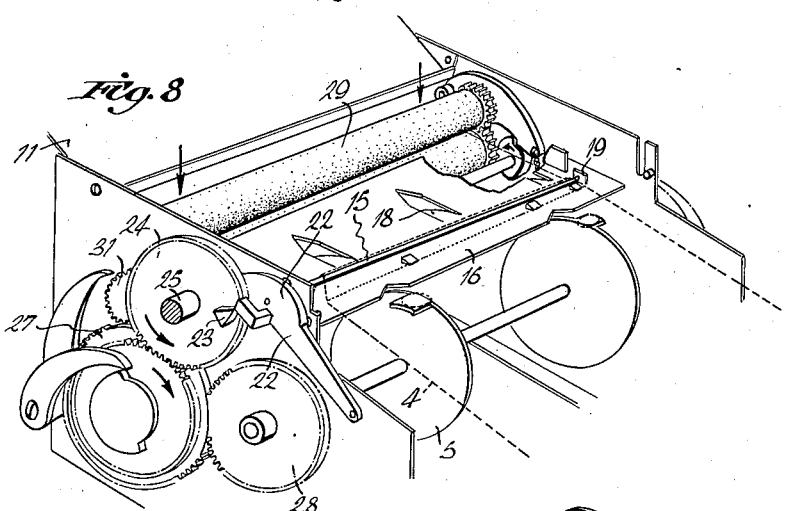
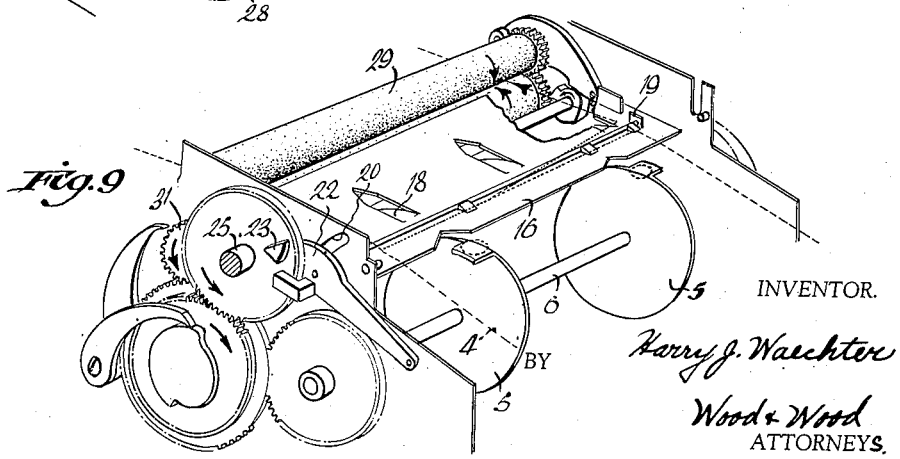

Aug. 17, 1937.            H. J. WAECHTER            2,090,585
                         AUTOGRAPHIC REGISTER
                 Filed Jan. 24, 1936        5 Sheets-Sheet 4

INVENTOR.
Harry J. Waechter
BY
Wood + Wood
ATTORNEYS

Aug. 17, 1937.   H. J. WAECHTER   2,090,585
AUTOGRAPHIC REGISTER
Filed Jan. 24, 1936   5 Sheets-Sheet 5

INVENTOR.
Harry J. Waechter
BY Wood & Wood
ATTORNEYS.

Patented Aug. 17, 1937

2,090,585

UNITED STATES PATENT OFFICE 2,090,585

AUTOGRAPHIC REGISTER

Harry J. Waechter, Mount Healthy, Ohio, assignor to Krauth & Benninghofen, Hamilton, Ohio, a firm Application January 24, 1936, Serial No. 60,614

14 Claims. (Cl. 164—84.5)

This invention relates to improvements in autographic registers and machines of a similar character, operating on one or a plurality of work strips of paper, the strips usually containing printed forms of a determined length and arranged in a consecutive order longitudinally of the strip. The strips are advanced from a supply roll over a writing table and when in a plural number, in a superposed arrangement for manifolding the entries made upon a form of the uppermost strip located upon the writing table, generally designated as the original.

In the preferred embodiment the strips, for the spacing of the form lengths, are provided with paper-weakening or perforated lines transverse or crosswise of the strip to facilitate separation or tearing the forms from one another and from the strip. The strip also, within each form length, is provided with apertures in aligned pairs crosswise of the strip, located in proximity to a tear line generally at the head end of the form, utilized in the advancing control of the strip.

The invention particularly relates to means for mechanically tearing the forms from the strip along the tear lines, following the advance or withdrawal from the writing table to separately issue or dispense the forms.

An object of the invention is to dispense or issue the forms individually and separately from the strip or strips, whether actually discharged from the machine or compiled within a storage compartment or space within the machine.

Another object of the invention is to tear off or separate the form sheets from the strip along tear-off lines while advancing or translating the form sheet to individually and separately dispense the same.

Another object of the invention is to tear a form length or sheet from a supply strip along a tear-off line by the mechanism employed for advancing or dispensing the sheet, the tear being preferably initiated at one edge of the sheet or point, thence progressively continuing along the tear-off line.

Other objects and further advantages of the invention will be more fully apparent from a description of the accompanying drawings, in which:

Figure 1 is a top plan view of the improved register with a portion of the cover or margin frame broken away to disclose the mechanism therebeneath.

Figure 2 is a section on line 2—2, Figure 1.

Figure 3 is an enlarged section, correspondingly of a portion of the mechanism shown in Figure 2, to which the invention is particularly directed.

Figure 4 is a section on line 4—4, Figure 3.

Figure 5 is a section on line 5—5, Figure 4.

Figure 6 is a perspective view of the mechanism shown in Figure 4.

Figures 7, 8, and 9 are perspective views similar to Figure 6, illustrating relative different stages of operation.

Figure 10:
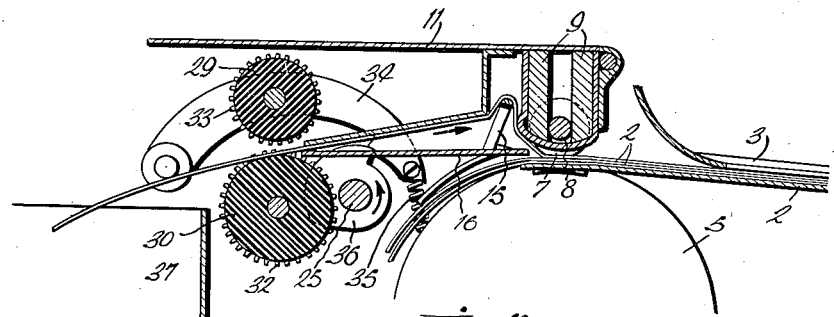
Figure 11:
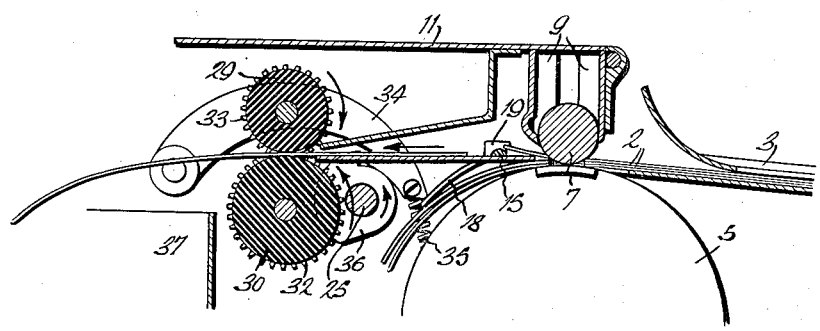

Figures 10 and 11 are sectional views corresponding to Figure 3, with the mechanism illustrated at different stages of operation.

Figure 12:
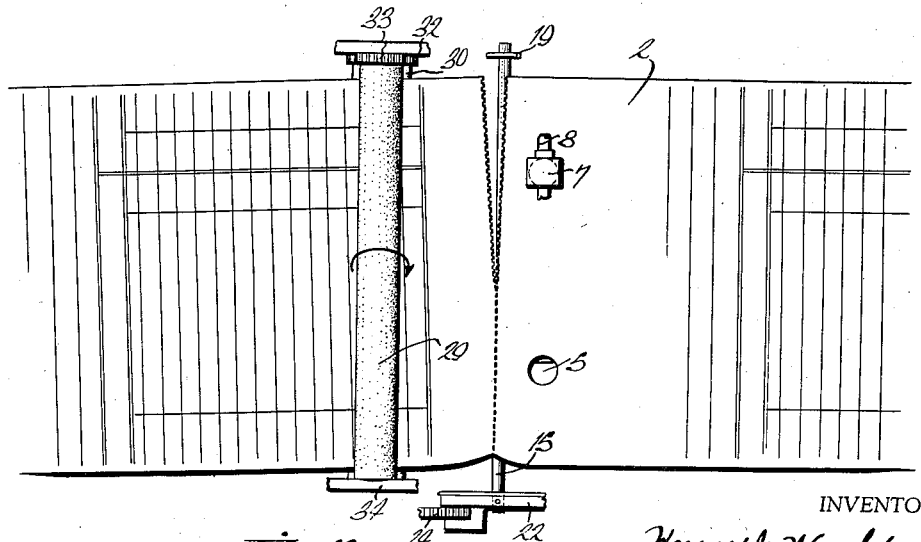

Figure 12 is a top plan view of a section of web or work strip in the process of tearing.

Figure 13:
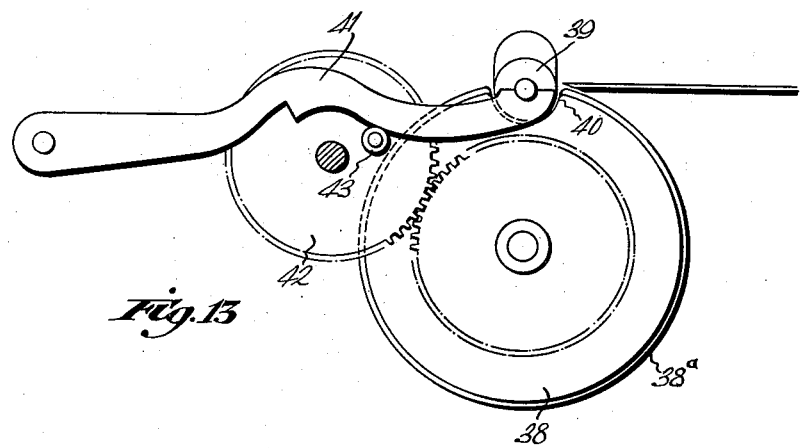

Figure 13 is a side elevation of a modified form of primary feed rolls.

Figure 14:
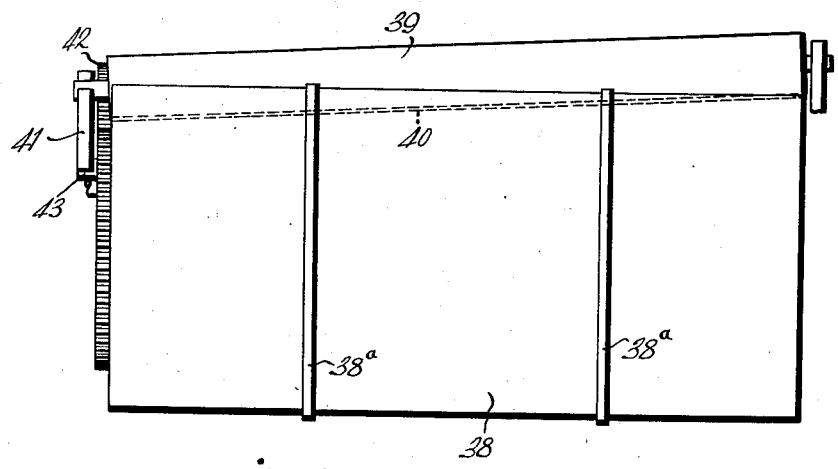

Figure 14 is an end or side elevation thereof.

In the preferred use of the machine it is contemplated to operate upon a manifold number of work strips, arranged in a relative superposed order and folded to pack in a flat packet. This strip, however, may be packed in roll, or other form, the manner of packaging being immaterial. A set of work strips, from the packet supply housed within the casing of the machine, is drawn over a writing table for making the manifolding entries thereon and is advanced by feed rolls or feeding devices. Each of the work strips is preferably correspondingly subdivided into sheet length by definitely spaced paper-weakening lines or perforations transversely of the strip to facilitate sequentially tearing the sheets from the strip as issued or withdrawn from the machine.

The work strips, when packet packaged, are zig-zag folded, the folds occurring along the transverse tearing lines. In the present instance the machine provides for automatically tearing or separation of the sheet length of only the uppermost work strip, which may be termed the original work strip, and depositing the same in a storage compartment within the casing of the machine. The lower work strips are guided downwardly away from the tearing mechanism for withdrawal and manual tear-off of the sheet lengths from the strips, or the continuous strips as withdrawn may be refolded and filed within the casing of the machine. This, however, is merely an embodiment for a particular use and is auxiliary to the construction and operation of the tearing mechanism, which is applicable for simultaneously tearing off a manifold number of sheet lengths permitted to be fed to the tear-off mechanism.

Referring to the drawings, 1 indicates the casing of the machine, having at its upper side a writing table or platen 2 deposited between a margin frame 3 as a partial top cover for the casing. The work strips 4, in triplicate number and in the flat packet form, are deposited within a compartment or space within the casing or in their original shipping container, and are fed therefrom upwardly over the rear end of the writing table 2 and thereupon extend forwardly for engagement by the feeding mechanism for advancing the work strips a measured or given length upon each rotation of an operating crank handle.

The measured lengths of the strip advance are governed by the spacing of the transverse tear lines and also by apertures, generally referred to as filling apertures in the sheet lengths. A set of apertures crosswise of the strip are usually located at a definite spacing in the rear of a tear-off line when the apertures are utilized for controlling the feeding advance of the strips.

The type of strip feeding mechanism, however, may be conventional and in the present instance constitutes a pair of lower discs 5—5, fixed upon a cross shaft 6 journalled within the opposite side walls of the machine casing. The spacing of the discs is governed by or relative to the crosswise spacing of a set of apertures in the work strips for effecting stoppage of the strip advance when the discs come into registry with the apertures. The lower strip feed roll discs 5—5 each respectively engages an upper feed roll 7 fixed upon a cross shaft 8 transversely slidable or movable within journal blocks 9—9, mounted within a hinged cover 11 for the forward top portion of the casing. Each journal block 9 carries a spring 10 for depressing the shaft 8, yieldingly urging the rolls 7—7 respectively into contact with the lower discs 5—5 and work strips 4 therebetween.

The shafts 6 and 8 are in transmission connection, the shaft 6 at one end carrying a gear 12 in mesh with a pinion 13 upon the corresponding end of the upper shaft 8. The shaft 6 is in transmission connection with a shaft actuated by a crank handle 14, limited to a single revolution by a suitable stop and latch mechanism, details of which are not illustrated herein, although representative of a common feature in autographic registers or manifolding machines in the class to which the present invention primarily appertains.

The lower feed discs 5—5 are of a diameter to provide a circumference dimension proportional to a maximum length of sheets or tickets so that the work strip is advanced sufficiently upon each revolution or single rotation of the crank handle to dispense a full sheet length. The feeding advance of the strip is definitely governed by the longitudinal spacing of the control or filing apertures longitudinally of the strip for bringing the sheet lengths of the several superposed strips into registration and alignment before the feeding advance is stopped.

The employment of feed rollers for strip advance in measured lengths offers advantages and simplicity for transmission connection with the feeding and severing mechanism and for a relative timed operation thereof, and also provides a secure grip upon the work strip during a tear-off interval of an issuing sheet length, although it is recognized that other methods of advancing or withdrawing the work strips over the writing table may be employed.

Numerous efforts have been made to provide a machine of this class with mechanical means for separating or severing the sheets from the strip or strips as they are issued or delivered, utilizing some form of cutter instrumentality. These, however, have not been dependable for any long period of service, particularly in the hands of users of this class of machine who are more or less unskilled in the handling and care of mechanical devices, and they have also materially added to the production cost of the machine, necessitating a selling price which would be prohibitive to the trade.

It has been discovered that if a starting tear or separation is made at a perforated or paper-weakening line at one edge or margin of the strip, under a slight pulling pressure and with the portion of the strip beyond such starting point in a slack condition to relieve the same from any pulling strains, a starting tear is easily accomplished, and under a continued advance of the sheet or strip beyond the tear-off line, progressively taking up the slack that the tear or separation can be continued with ease, and, under the pulling strain, sufficient to advance the issuing portion of the strip, as is imparted by a set of feed rollers frictionally gripping the strip or sheet and advancing it under roll rotation, and a tear-off accomplished without undue power over that required for the ordinary advance of the sheets or strips and without interruption to its advance.

Under the method herein employed, after the strip has been advanced sufficiently for a delivery of a sheet length and the feeding instrumentalities brought to rest with the tear-off line beyond the feeding instrumentalities or feed rollers 5, 7, the extended or issued portion of the strip, in proximity to the tear-off line, is angularly buckled laterally to the plane of the strip. Under such condition the strip is gripped by a pair of coacting feed rollers and by a second set of feed rollers positioned slightly in advance of the buckle, whereupon upon actuating or rotating the feed rollers, a pulling or advancing pressure is exerted upon one edge of the strip which has no slack between the two sets of feed rollers and will readily initiate a tear or separation at the tear-off line and the tear continued as the feed rollers take up the slack and cause a pulling strain to be imparted thereon, with the portion in the rear of the tear-off line being held against advance under the resistance against advance imparted thereon through the contacting pressure or friction by the idle first set of feeding instrumentalities. The operation is very rapid so that a feeding advance to a predetermined or measured amount and tear-off of the issued or delivered portion is accomplished within a single cycle of the crank handle, and the operation can be repeated at any speed rate at which it is possible for the operator to perform.

Immediately forward of the primary strip feeding instrumentalities or feed discs 5 and rolls 7, a strip buckling or puckering rod 15 is provided extending transversely of the strip or crosswise of the machine casing, adapted to lie beneath the work strip or strips. In the present instance the puckering rod 15 is mounted upon a horizontal guide plate 16 located within the casing, having its opposite ends fixed to the side walls of the casing.

As the sheet tear-off in the machine illustrated is performed only upon the uppermost or original strip of the number of strips employed, the under strips are guided by the guide plate 16 in a departing direction from the uppermost strip downwardly below the guide plate 16, as illustrated in Figure 2, upon a receiving tray 17. This, however, is merely to meet a particular demand as any number of the strips could be directed as a unit with the topmost strip for a sheet length tear-off functioning.

The guide plate is punched to provide downwardly extending longitudinally curved guide tongues 18—18 to assist in directing the strips downwardly upon the tray 17 where they are accessible through an opening in one of the side walls of the casing for manual removal and tear-off from their respective strips.

One end of the puckering rod 15 is loosely engaged through an aperture in an upstanding lug or ear 19 formed on the upper side of the guide plate 16, and the opposite end of the rod protrudes through a curved slot 20 in the side wall 21 of the casing to bring the same exteriorly thereof and allow it to be moved upwardly, and connects with a trip arm 22 pivotally mounted upon the exterior side of the casing wall 21. The rod, lying beneath the extruded portion of the strip, when elevated at one end, will angularly buckle or pucker the strip to provide a certain amount of slack in the portion of the strip between the main set of feeding rolls 5, 7, and an auxiliary set of feeding rolls. The slack, due to the inclination of the pucker, thus varies in degree from one longitudinal edge of the strip to the opposite edge thereof.

The trip arm 22 is of a configuration to weight its free forward end, which carries the puckering rod, for automatically retracting or normalizing the arm and rod, and has at its outer side an angled lug extended therefrom for engagement with a trip lug 23 on the outer side of a gear 24 mounted on a cross shaft 25 journalled in the side walls of the casing. The shaft 25, at its outer end, carries the crank handle 14 for manually operating the actuated parts of the machine in gear or transmitting connection therewith.

The gear 24 is in mesh with a gear 26 fixed to an adjacent fragment gear 27 as members of a compound gear journalled on the side wall 21 of the casing. The fragment gear 27, in turn, cooperates with a fragment gear 28 fixed upon the outer end of the cross shaft 6, carrying the lower feed discs. The fragment gears 27 and 28 provide for a non-transmitting or idling period for the shaft 6 and its feed discs 5, and upper rolls 7 transmittingly connect therewith for holding the strip against advance during a tear-off interval of the extruded sheet length thereof.

Thus, in each cycle of the gear 24 at an appropriate timed period, the tip lug 23 will cooperate with the trip arm 22 to swing the same, and the puckering rod, upwardly for puckering the extruded end of the strip. The extruded end of the strip traverses between a set of secondary feed rolls constituting an upper feed roll 29 and a lower feed roll 30, normally in a separated position for free passage of the strip therebetween during the normal feeding advance of the work strip over the writing table and for extruding the forward end thereof.

The lower roll 30 is journalled in the side walls of the casing. Its axis, at one end, extends exteriorly of the side wall 21 and carries a pinion 31 in mesh with the fragment gear 27 for transmittingly connecting the feed rolls with the crank handle. The opposite end of the lower feed roll 30 carries a pinion 32 in mesh with a pinion 33, fixed on the corresponding end of the upper feed roll 29.

The upper feed roll 29, at its opposite ends, is journalled upon a pair of arms 34—34, respectively pivotally mounted upon a side wall of the casing for elevating the upper feed roll 29 to separate it from contact or cooperation with the lower feed roll 30 and for depressing the same for an appropriate period to administer a tear-off of the extruded end of the work strip.

Each of the arms 34, respectively at its free end, connects with a spring 35 having one end fixed to the side wall of the casing for yieldingly urging the arm and upper roll downwardly and the arm against the periphery of a cam 36 fixed upon the cross shaft 25 for appropriately controlling and actuating the roll carrying arms 34. The cam periphery is of an appropriate configuration for effecting the proper timed actuation of the roll carrying arms to allow the upper roll to be lowered and to frictionally cooperate with the lower roll 30 for advancing the extruded end of the work strip sequentially after the extruded end has been puckered, maintaining the pucker between the two sets of feed rolls for a tear-off operation.

As previously mentioned, the inclined puckering, transversely of the strip, results in providing various degrees of slack from one longitudinal end of the strip toward the other to initiate a feeding pull at one longitudinal edge of the strip for a commencement of tear at a tear-off line, and thus progressively continue across the strip for completely separating the protruded end from the strip during the continued advance of the protruded end, ejecting the same from the machine or conveying the same into a storage compartment 37 within the upper forward end of the casing.

The primary feed rolls in the modified form shown in Figures 13 and 14 are arranged to pucker or irregularly slack the strip and therefore substitute for the puckering rod 15 included in the form shown in Figures 1 to 12 inclusive. The modification provides a lower feed roll 38 of drum form, having a pair of spaced peripheral ribs 38a—38a which normally contact with the periphery of the upper feed roll 39, functioning substantially as the discs 5.

The drum periphery, longitudinally, has an inclined or tapering groove 40 into which the upper feed roll 39 recedes or engages when the groove comes into registry therewith, for puckering or fluting the portion of the strip therebetween, thereby providing varying degrees of slack in the portion of the strip between the primary feed rolls and the secondary feed rolls 29 and 30, not shown in Figures 13 and 14, corresponding however to the secondary feed rolls previously described.

The upper feed roll 39 is depressed against the lower feed roll 38, or against the annular ribs 38a—38a, by springs, as described for the form of mechanism disclosed in Figures 1 to 12 inclusive, thereby adapting the upper feed roll to automatically engage into the longitudinal groove 40 when the groove, during the rotation of the feed rolls, is brought into registration with the upper feed roll.

The upper feed roll is extracted from the groove by a lever 41 pivotally mounted at one end upon a wall of the machine frame. Its opposite end is notched to engage with the axis of the upper feed roll, protruding from one end thereof. The lever 41 is actuated by a gear 42 through the medium of a pin 43 projecting from one side of the gear. The gear 42 is in transmission connection with the gearing for rotating the feed rolls.

A complete operation for delivering and tearing a form length or sheet from the strip in the present arrangement is effected by a single revolution or cycle of the lower feed roll 38. The strip is advanced with the rotation of the feed rolls 38, 39 and when the groove 40 comes into registration with the upper roll 39 the upper roll will recede angularly into the groove, puckering or fluting that portion of the strip between the rolls.

The portion or end of the strip extruded by the primary feed rolls at such time is free from any grip or resistance by the secondary feed rolls so that there is no pull upon the portion of the strip at the approach side of the primary feed rolls under the compression action of the upper roll when engaging into the groove 40, thereby avoiding any disturbance to the strip or strips over the writing table, which usually is sustained under a slight tension. The strip puckering operation is momentary as the upper roll is immediately elevated by the lever 41 to its normal position for contact with the ribs 38 of the lower roll to continue the advance of the strip for the remaining amount necessary to extrude or expel the full length of the form.

The operation of the secondary sheet feeding rolls at a proper timed sequence is effected substantially as heretofore described for advancing and tearing the form from the strip and dispensing the same. The puckering of the strip provides for initiating a tear at one edge of the paper and progressively continuing along the tear line for the width of the strip. Under the feeding or advancing force of the form sheet, the primary feed rolls, during a form tear-off interval, are idle, thereby withholding strip movement at one or rear side of the tear-off line.

Having described my invention, I claim:

1. In a device of the class described, a platen over which a strip of paper passes, the strip being weakened along transverse lines at determined spacing for severing sheet lengths from the strip, cooperating strip feed rolls between which the strip is engaged for advancing the same over the platen and withdrawing the same therefrom, means crosswise of the platen in juxta-position to said feed rolls, over which the strip translates in its feed roll advance to acutely angularly dispose the strip at a weakened line for initiating a tear of the strip at one edge thereof, and sheet feeding means for feeding and tearing from the strip the sheet extruded by said feed rolls.

2. In a device of the class described for feeding a work strip and separating a delivery portion therefrom, the strip being weakened on lines transverse of the strip at determined spacings apart at which the separation is to be made for dividing the same into sheet length, comprising, a set of feed rolls between which the work strip is engaged and thereby advanced, a second set of feed rolls in juxta-position to said first set, between which the extruded section of the strip from said first set of feed rolls is engaged and advanced for tear-off and delivery, and means for puckering the portion of the strip extending between said two sets of feed rolls, adapting the advancing force upon the extruded section of the strip to be administered to only a fractional width part thereof for initiating a separation of the strip at a weakened line and progressively continuing the separation under the feeding advance for complete separation of the advancing section from the strip and delivery thereof.

3. In a device of the class described for feeding a work strip and separating a delivery portion therefrom, the strip being weakened on lines transverse of the strip at determined spacings apart at which the separation is to be made for dividing the strip into tear-off sections, comprising, a set of feed rolls between which the work strip is engaged and thereby advanced, a second set of feed rolls in juxta-position to said first set, between which a section of the strip extruded by said first set of feed rolls is engaged and advanced for tear-off and delivery, and means intermittently effective for puckering the strip between adjacent sections and extended between said two sets of feed rolls, adapting an advancing force upon the extruded section to be administered to only a fractional width part thereof for initiating a separation of the strip at a weakened line and progressively continuing the separation under the feeding advance for complete separation of the advanced section of the strip and delivery thereof.

4. In a machine of the character described, a casing equipped with a platen, a primary feed mechanism operated to feed a strip across and to project the same beyond the platen, the strip being sub-divided into sections by tear lines transversely of the strip, auxiliary feed mechanism intermittently effective to grip and feed a strip section projected by said primary feeding mechanism to separate the same from the work strip along a weakened line and for delivery thereof and means for shifting the strip section divergently from the line of delivery of said primary feed mechanism so that the tear of the section from the strip is initiated at one edge and continues toward the opposite edge in advancing the section by said auxiliary feed mechanism.

5. In a machine of the character described, a casing equipped with a platen, a primary feed mechanism operated to feed strips across and to project the same beyond the platen, the strip being sub-divided into sections by tear lines transversely of the strip, a filing compartment, an auxiliary feed mechanism intermittently effective to grip and feed a section of one of said strips projected by said primary feeding mechanism to separate the same from the work strip along a weakened line and delivery into said filing compartment, and means for shifting the strip section divergently from the line of delivery of said primary feed mechanism so that the tear of the section from the strip is initiated at one edge and continues toward the opposite edge in advancing the section by said auxiliary feed mechanism.

6. In a machine of the character described, a casing equipped with a platen, a primary feed mechanism operated to feed a strip across and to project the same beyond the platen, the strip being sub-divided into sections by tear lines transversely of the strip, auxiliary feed mechanism operative sequentially upon cessation of said primary feed mechanism to grip and feed the section projected by said primary feeding mechanism to separate the same from the work strip along a weakened line and for delivery thereof and means for shifting the strip section divergently from the line of delivery of said primary feed mechanism so that the tear of the section from the strip is initiated at one edge and continues toward the opposite edge in advancing the section by said auxiliary feed mechanism.

7. In a machine of the character described, a casing, a primary feed mechanism operative to feed a strip and project a section thereof, the strip being divided into sections by tear lines extended transversely to the length of the strip, an auxiliary feed mechanism operated in sequence to the primary feed mechanism to advance the section of the strip projected by said primary feed mechanism and thereby institute a tear-off of said section from the strip, and means operative for introducing variable degrees of slack in the spread of the strip between the primary and auxiliary feed mechanisms for administering a progressive tear-off of the projected section from the strip along a tear line.

8. In a machine of the character described, a primary feed mechanism operated to feed a strip of paper, the strip being subdivided into sections by tear lines transversely of the strip, an auxiliary feed mechanism effective to grip and feed the strip section projected by said primary feeding mechanism to separate the same from the strip along a tear line and for delivery thereof, and means for diverting the strip section from the line of delivery of the primary feed mechanism for initiating the tear at one end of the line in advancing the section for separation and delivery, and progressively continuing the tear until the section is separated from the strip.

9. In a machine of the character described, a primary feed mechanism operated to feed a strip of paper, the strip being subdivided into sections by tear lines transversely of the strip, an auxiliary feed mechanism effective to grip and feed the strip section projected by said primary feeding mechanism to separate the same from the strip along a tear line and for delivery thereof, the elements of said primary feeding mechanism cooperating for an interval apart from their normal feed cooperation and diverting the strip section from its line of delivery, thereby conditioning the strip section, for initiating the tear at one end of the line and progressively continuing until the section is separated from the strip in the advance of the section by said secondary feeding mechanism.

10. In a machine of the character described, a primary feed mechanism operated to feed a strip of paper, the strip being subdivided into sections by tear lines transversely of the strip, an auxiliary feed mechanism effective to grip and feed the strip section projected by said primary feeding mechanism to separate the same from the strip along a tear line and for delivery thereof, and means interposed between said primary and secondary feeding mechanisms for diverting the strip section from the line of delivery of said primary feed mechanism for initiating the tear at one end of the line and progressively continuing until the section is separated from the strip, in the advance of the section by said secondary feeding mechanism.

11. A web feeding device, comprising, a pair of feed rolls for advancing the web, the web being divided into sections by transverse tear lines, a second pair of feed rolls for dispensing a leading section of the web when delivered by said first pair of rolls and tearing the same from the strip, and means for diverting the line of delivery of said leading section after being delivered by said first pair of rolls, whereby upon continued advancement of the section by said second pair of feed rolls it will be detached from the web and the tear initiated at the tear line from one end thereof and continuing toward the opposite end.

12. A web feeding device, comprising, a pair of feed rolls for advancing the web, the web being divided into sections by transverse tear lines, a second pair of feed rolls for dispensing a leading section of the web when dispensed by said first pair of rolls and tearing the same from the strip, and means interposed between said first and second pairs of feed rolls for diverting the line of delivery of said leading section after being dispensed by said first pair of rolls, whereby upon advancement of the section it will be detached from the web and the tear initiated at the tear line from one end thereof and continuing toward the opposite end.

13 A web feeding device, comprising, a pair of feed rolls for advancing the web, the web being divided into sections by transverse tear lines, a second pair of feed rolls for continuing the advance of a leading section of the web when dispensed by said first pair of rolls, tearing the same from the strip, said second pair of rolls intervally cooperating for diverting the line of delivery of said leading section after being dispensed by said first pair of rolls, whereby upon advancement of the section by said second pair of feed rolls it will be detached from the web and the tear initiated at the tear line from one end thereof and continuing toward the opposite end.

14. The method for separately dispensing sheet sections joined in a continuous web, comprising, feeding the web and delivering a leading section by one set of feeding rolls, diverting said leading section from the line delivered by said rolls and dispensing the same by a second set of rolls, the advancement thereof causing a separation of the section from the web by initiating a tear at one end, and progressively separating and continuing the tear toward the opposite end.

HARRY J. WAECHTER.